Feb. 2, 1954 — W. H. HARSTICK — 2,668,001
CONTINUOUS MILK FILLING SYSTEM
Filed Oct. 7, 1950 — 2 Sheets-Sheet 2

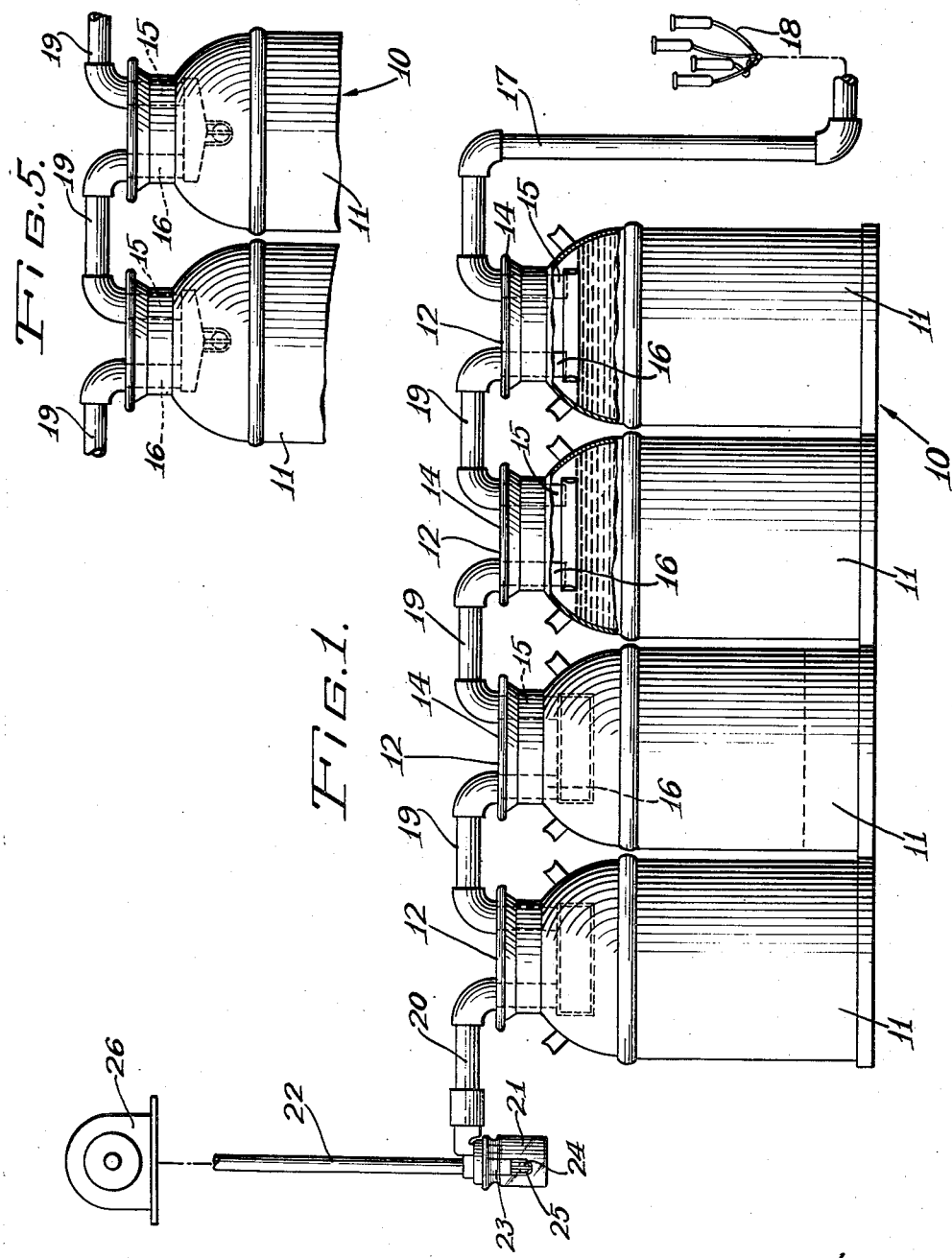

Inventor:
William H. Harstick
Paul O. Pippel
Atty.

Patented Feb. 2, 1954

2,668,001

UNITED STATES PATENT OFFICE 2,668,001

CONTINUOUS MILK FILLING SYSTEM

William H. Harstick, Oak Park, Ill., assignor to International Harvester Company, a corporation of New Jersey Application October 7, 1950, Serial No. 189,000

6 Claims. (Cl. 226—116)

This improvement relates to a system for filling milk cans. More particularly this improvement relates to a filling attachment for a can structure particularly suited for a pipe line milking system.

In pipe line milking systems the milk is generally taken from the cows and delivered through the teat cups and the cluster into a pipe line milking system. The milk is carried from the pipe line system directly into the ultimate destination which in a system of this kind is the milk cans. The milk cans are connected in series so that the cans are filled successively. Each can is provided with a can head having a milk inlet and a milk outlet connection. The milk inlet of one can is connected to the milk outlet of a preceding can and as one can of the series is filled the milk overflows into the second can which is thereupon filled to the desired level. The last can of the series is generally connected to a vacuum line which places the cans under a minus pressure.

In this system of filling it has been found that under certain conditions excessive frothing of the milk occurs. The milk inlet and outlet tubes generally extend down into the can to somewhat the same level. As a can therefore is filled the milk level rises until it reaches the lowermost point of the milk outlet pipe. Milk continues to flow into the can and this milk before passing to the milk outlet generally intermingles with the milk already within the can. This intermingling is not desirable since frothing occurs and therefore undesirable globules of butter fat may be formed. It is applicant's prime object therefore to provide an improved continuous milk filling system wherein each of a series of cans is provided with an effective device for bypassing milk from the inlet pipe to the outlet pipe without intermingling of the milk within the cans.

Still another object is to provide a can head for a filling can adapted to be used in a continuous milk filling system, the can head including inlet and outlet pipes and being provided with a tray or receptacle which is normally in an out-of-the-way position as milk flows from the inlet pipe to the can, the tray being connected so that it may be moved into position for receiving the milk from the inlet pipe and directly deliver the same to the outlet pipe thereby by-passing the milk which has collected within the can.

These and further objects will become more readily apparent from a reading of the specification when taken in connection with the illustrations shown in the accompanying drawings.

In the drawings:

Fig. 1 is a side elevational view of a continuous milk filling system.

Fig. 5 is a portion of a continuous milk filling system showing a modified form of can filling head on the cans of a filling system.

Figure 4:
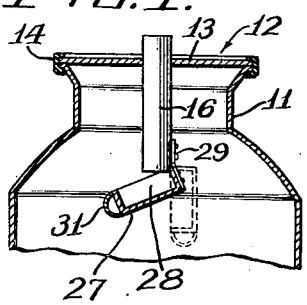
Fig. 4 is a cross-sectional view of a milk can showing a filling head, the view being taken substantially along the line 4—4 of Fig. 2.

A continuous milk filling system is generally designated by the reference character 10. This system includes a plurality of cans 11, each can having a closure head 12. As best shown in Figs. 1 and 4, the closure head 12 consists of a flat plate 13 which is positioned over the open end of the can 11, the plate being connected to the can by means of a rubber seal 14 which suitably seals the interior of the can from the atmosphere. As best shown in Figs. 1, 2, 3, and 4, the closure head 12 is provided with a milk inlet pipe 15 which extends downwardly into the can 11. A milk outlet pipe 16 is also connected to the closure head 12, the pipe 16 extending through the flat plate 13 downwardly into the can 11.

As best shown in Fig. 1 the milk inlet pipe 15 of the first can is connected to a milk pipe line 17. The milk pipe line 17 may extend to a milking parlor or milking stall wherein it communicates with a teat cup cluster 18.

As best shown in Fig. 1 the milk outlet 16 is connected with the milk inlet 15 of a succeeding can by means of a short piece of conduit 19. The cans of the series are thus connected and the last can of the series is provided with a vacuum connection 20 which in turn is connected to a trap 21. The trap 21 is in communication with a vacuum conduit 22 which is in communication with an extension 23 projecting inwardly into the trap 21. A float valve 24 is positioned beneath the extension 23, the valve being contained within a cage 25. The vacuum conduit 22 is in communication with a vacuum pump 26 generally shown in schematic form.

Referring now to Figs. 1, 2, 3, and 4, it can be seen that each can 11 is provided with a receptacle or tray generally designated as 27. The receptacle or tray 27 includes a chamber or trough 28, the receptacle being suitably pivoted on hinges 29 and 30 which are respectively connected to the milk inlet and outlet pipes 15 and 16. The receptacle or tray 27 is provided with a suitable float 31 adjacent one edge thereof. The float 31 may consist of any suitable construction having proper buoyancy.

In the operation, milk from the teat cup cluster 18 flows through the pipe line 17 through the milk inlet 15 into the can 11. At this point the tray 27 is in a downwardly hinged position so that it is out of the way of the incoming milk stream which flows into and fills the first can of the series. As the first can of the series begins to fill, the liquid level rises until it reaches the float 31. As the milk level begins to rise further, the buoyancy of the float 31 causes the tray 27 to move or hinge and assume the flat horizontal position shown in the first two filling cans of Fig. 1. As the tray assumes this horizontal position, the chamber or trough 28 is in such a position that milk flowing out of the inlet 15 is directly delivered or diverted to the milk outlet. Thus the milk is by-passed into the succeeding can without any intermingling of the can which has previously been filled. Each of the cans 11 thus fills in this manner and as each of the cans is filled the tray 27 acts to by-pass the milk into the succeeding can without any intermingling and subsequent frothing.

As previously indicated, the cans 11 are subject to a minus pressure since the vacuum connection 20 communicates through the vacuum pipe 22 with a vacuum pipe or tank 26. As the last can 11 is filled, the tray 27, of the last can also assumes the horizontal position whereupon milk is by-passed into the vacuum conduit 20, this milk flowing into the trap chamber 21. The trap chamber 21 thus begins to fill and the float 24 seats over the end of the pipe extension 23 shutting off the vacuum to the system, whereupon filling of the cans and flow of milk is stopped. It can be seen that each of the outlet tubes or pipes also acts as a vacuum connection, this vacuum connection being necessary to properly draw milk from a preceding can to a subsequent can.

As best shown in Figs. 5, 6, 7, and 8, a modified form of invention is herein disclosed. The filling system is generally the same and the same reference characters will apply. The cans and the filling heads likewise are generally of similar structure. The inlet and outlet pipes 15 and 16 of each can filling head are provided with a receptacle 35 which is permanently secured to pipes 15 and 16 and is suspended therefrom. The receptacle includes a chamber 36 which is provided with an opening 37, the opening 37 extending below the open ends of the tubes 15 and 16.

Figure 6:
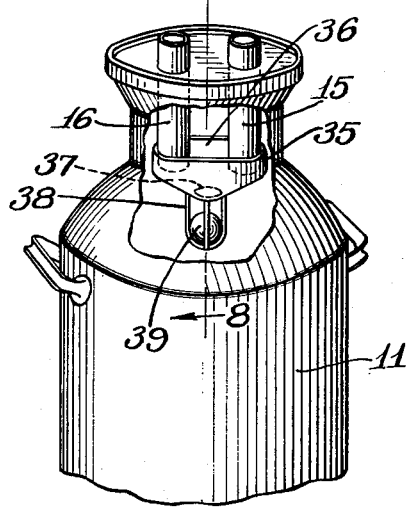
Fig. 6 is a perspective view showing a milk can having portions broken away to illustrate a modified form of a can filling head.
Figure 7:
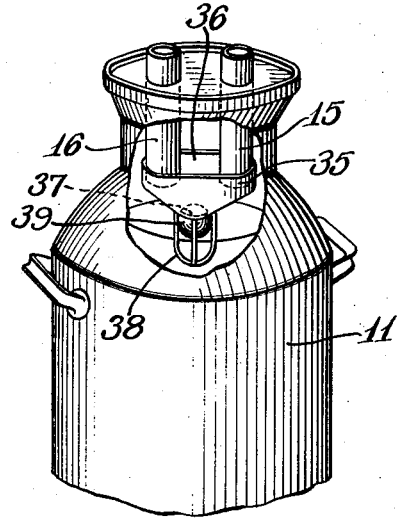
Fig. 7 is a perspective view similar to Fig. 6 showing an operating position of the elements of the invention.
Figure 2:
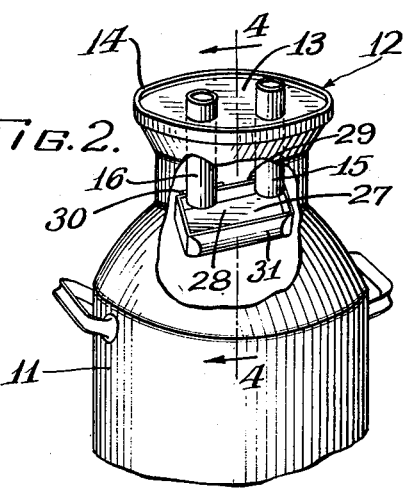
Fig. 2 is a perspective view of a can used in a continuous milk filling system, the can having portions broken away to illustrate the invention.
Figure 3:
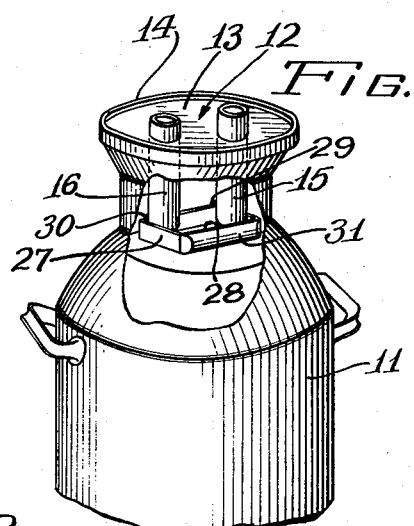
Fig. 3 is a perspective view of the can shown in Fig. 2 showing an operating position of certain elements of the invention.
Figure 8:
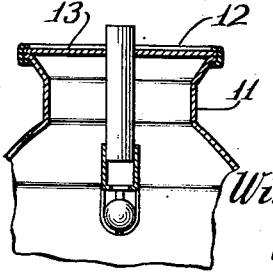
Fig. 8 is a cross-sectional view of the filling head and can shown in Fig. 6, the view being taken substantially along the line 8—8 of Fig. 6.

As best shown in Figs. 6, 7, and 8, a cage 38 depends downwardly from the receptacle 35. The cage 38 is provided with a ball valve which may be raised or lowered for respectively closing and opening the opening 37.

The operation of this modification is similar to the operation previously described. As the milk flows into the inlet pipe 15 and down into the can 11, the can 11 begins to fill. When the level of the can is such that the ball or float valve 39 is pushed upwardly against the opening 37 to cover the same, milk which is passing into the receptacle 35 from the tube 15 is now diverted completely to the milk outlet 16 which carries the milk to the inlet pipe 15 of a subsequent can. Thus it can be seen that all the cans may be filled and that the milk is properly diverted from the filled can so that substantially no frothing or intermingling can occur.

It can now be seen that an effective construction has been provided for preventing the intermingling of milk as the series of cans are being filled. By this manner an inexpensive can head structure is provided, the structure permitting the quick and effective filling of the milk cans without the necessity of the constant attention of the operator. Since the diversion of milk from one can to another is accomplished automatically by the float arrangements, it is not necessary for the operator to manually take charge until all the cans have been filled.

It must be understood that changes may be made in the preferred embodiment and in the modifications without departing from the spirit of the invention as disclosed nor the scope thereof as defined in the appended claims.

What is claimed is:

1. In a milking system for successively filling a series of milk cans to a predetermined level, comprising a can closure head adapted to seal each can, a milk inlet tube carried by each closure head and projecting into each can, a milk outlet tube carried by each closure head, means connecting the first can of the series to a milk line, means connecting each milk outlet tube of a preceding can to the milk inlet tube of the next can, a vacuum connection on the last can of the series for providing a minus pressure in the cans of the series, and means for connecting the milk inlet tube of each can with the milk outlet tube of each can to provide for direct communication therebetween, said means including a tray having a trough positioned within the can, said tray being movable in response to the rise of the liquid within the can to a predetermined level for connecting said trough with said inlet and outlet tubes.

2. A milking system as claimed in claim 1, including means for hingedly connecting said tray within the interior of said can.

3. A can adapted to connect to another can for successive filling of both cans, comprising a milk inlet connection including an inlet conduit extending into and in communication with said can, a milk outlet connection including an outlet conduit laterally spaced with respect to said inlet conduit, extending into and in communication with the can and adapted to connect to the inlet connection of a succeeding can, and means disposed within the can for diverting the incoming stream of milk to the milk outlet pipe said means including a movable receptacle having a chamber movable with said receptacle, in response to the rise of the liquid level within said can, from a non-communicating position to a position wherein said chamber provides for communication between said inlet and outlet conduits, whereby the milk is directly carried from said can without intermingling of the milk within the can.

4. In a milking system for successively filling a series of milk cans to a predetermined level, comprising a can closure head adapted to seal each can, a milk inlet tube carried by each closure head and projecting into each can, a milk outlet tube carried by each closure head, means connecting the first can of the series to a milk line, means connecting each milk outlet tube of a preceding can to the milk inlet tube of the next can, a vacuum connection on the last can of the series for providing a minus pressure in the cans of the series, and means for connecting the milk inlet tube of each can with the milk outlet tube of each can to provide for direct communication therebetween, said means including a tray having a liquid receiving chamber, said tray being hingedly connected within the can and being normally positioned to one side of the stream of milk delivered through the milk outlet, said chamber being movable with said tray into communication with said inlet and outlet pipes during a rise in the liquid level within the can to a predetermined height whereupon the liquid from said inlet tube is intercepted and directed to the outlet tube without intermingling with the milk within the can.

5. In a milking system for successively filling a series of milk cans to a predetermined level, comprising a can closure head adapted to seal each can, a milk inlet tube carried by each closure head and projecting into each can, a milk outlet tube carried by each closure head, means connecting the first can of the series to a milk line, means connecting each milk outlet tube of a preceding can to the milk inlet tube of the next can, a vacuum connection on the last can of the series for providing a minus pressure in the cans of the series, and means for connecting the milk inlet tube of each can with the milk outlet tube of each can to provide for direct communication therebetween, said means including a receptacle, said receptacle being movably disposed within the can and being normally positioned to one side of the stream of milk delivered through the milk outlet, said receptacle being movable with said tray into communication with said inlet and outlet pipes during a rise in the liquid level within the can to a predetermined height whereupon the liquid from said inlet tube is intercepted and directed to the tray and thereupon to the outlet tube without intermingling with the milk within the can.

6. A milking system in accordance with claim 5 including a float connected to said receptacle, the float being arranged to move the receptacle into communication with the inlet and outlet pipe upon the float being engaged by the liquid as it reached a predetermined level within the cam.

WILLIAM H. HARSTICK.

References Cited in the file of this patent

UNITED STATES PATENTS

| Number | Name | Date |
| --- | --- | --- |
| 895,208 | Sinclair | Aug. 4, 1908 |
| 2,006,393 | Hapgood | July 2, 1933 |
| 2,380,771 | McDonald | July 31, 1945 |
| 2,498,401 | Duncan | Feb. 21, 1950 |